Dec. 24, 1968   J. GONSKI ET AL   3,417,851
LOADING HEAD

Filed Jan. 12, 1967   2 Sheets-Sheet 1

INVENTORS
JOSEPH GONSKI
GUSTAF ALBERT MARBERG

BY *Hill, Sherman, Meroni, Gross & Simpson*
ATTORNEYS

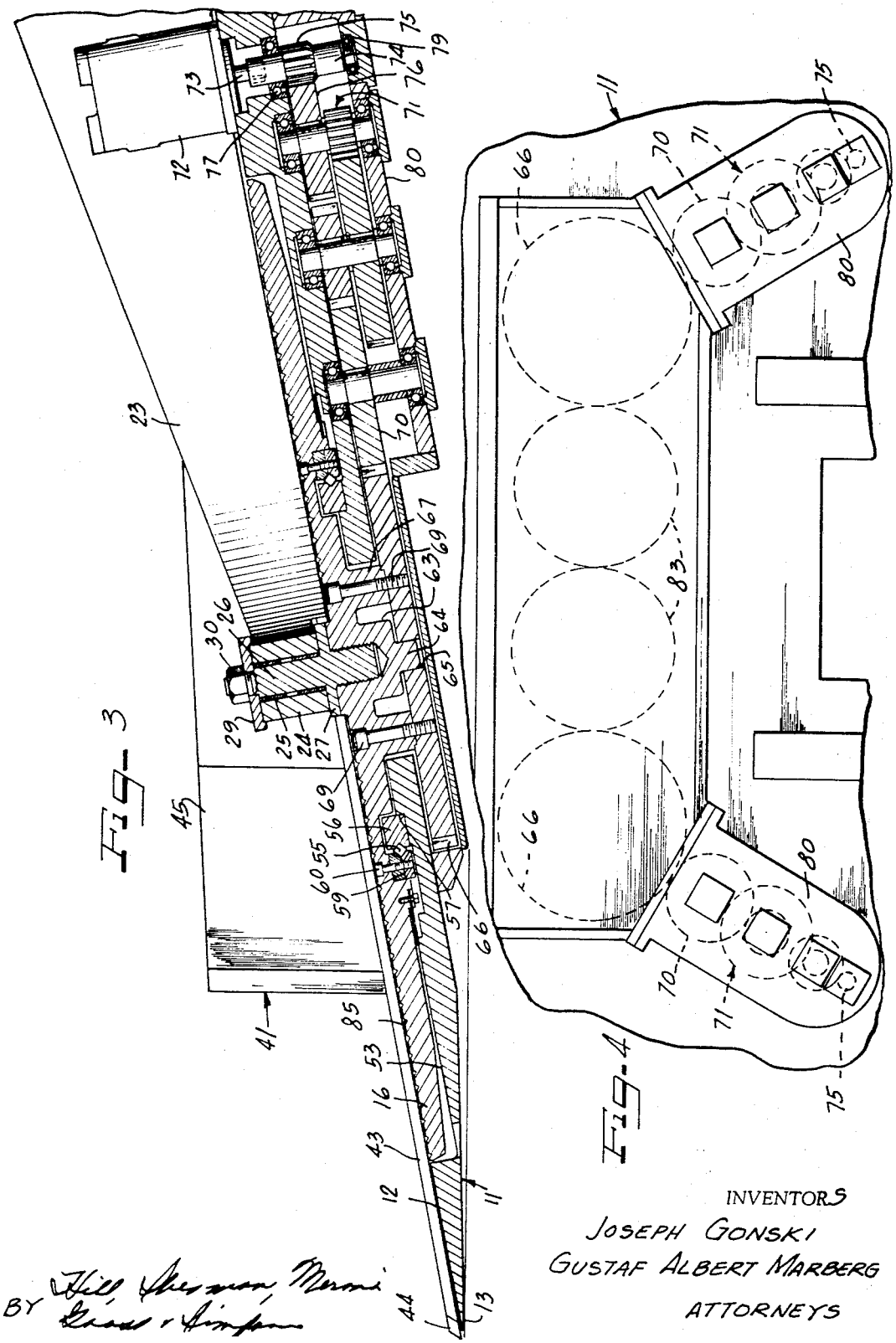

United States Patent Office 3,417,851
Patented Dec. 24, 1968

3,417,851
LOADING HEAD
Joseph Gonski, Chicago, and Gustaf Albert Marberg, Oak Park, Ill., assignors to Westinghouse Air Brake Company, Pittsburgh, Pa., a corporation of Pennsylvania
Filed Jan. 12, 1967, Ser. No. 608,889
3 Claims. (Cl. 198—9)

ABSTRACT OF THE DISCLOSURE

A loading head for coal and like loose materials, having an inclined apron having a plow-like nose crowded into the loose material by continuous traction tread devices. Two counter-rotating, relatively large diameter discs, positioned closely adjacent each other and equal distances from opposite sides of the center of the apron, are recessed in the apron, behind the plow-like nose of the apron. These discs have textured faces to provide friction gripper surfaces for the loose material and are driven at equal speeds to rotate toward each other at the front of the apron, and away from each other as they approach the conveyor of the machine. Strippers of a modified cycloidal form, extend over the discs from the centers of rotation of the discs to the side walls of the conveyor. Wings extend along each side of the apron and are pivotally mounted on the apron at their rear ends and have upright side walls and flat bottom plates, which are movable over the discs as the wings are moved inwardly.

Background of the invention

The present loading head, while serving as an efficient loading head for loading machines is particularly adapted for continuous mining machines of the ripper type, where a wide loading head is required beneath the ripper cutter drum, which is wide enough to contain all of the material dislodged from the mine face.

The loading area of the loading head, therefore, is beyond the reach of the conventional gathering arm or endless chain types of loading heads heretofore used with such machines, and counter rotating discs attain a smooth continuous flow of material onto the conveyor of the machine, in contrast to the surging flow of material caused by intermittently acting gathering arms.

While disc types of loading devices have heretofore been considered for loading loose material such as coal, such disc type loading devices have been mounted on the top surface of the apron of the loading head and usually project above the surface of the apron and forwardly of the ground engaging edge of the apron, to gather in the mined material on the mine floor and move it back onto the conveyor.

This has resulted in an offset barrier between the apron and the top surface of the disc, which retards the passage of material over the disc surfaces. The greater part of gathering by previous disc types of loading heads has, therefore, been performed by the edges of the discs.

Fingers, ribs or other projections, projecting from the edges of the discs and extending along the top surfaces of the discs, have been provided to attain a better grab of the material being loaded. This grab, and particularly at the edges of the discs introduces a strong expelling force on the backsides of the discs along the conveyor tending to expel the material from the apron and away from the conveyor and to push the material off the front of the gathering head. This markedly reduces the cleanup capacity of the gathering head, particularly where the discs rotate at high enough speeds to be effective, and also creates a crushing wedging action between the counter rotating discs, which further reduces the efficiency of loading and creates an undue amount of fine coal and dust.

Summary of invention and objects

The invention is generally directed to loading heads for use with continuous mining machines of the ripper type and attains a wide loading area by utilizing an inclined apron having a plow-like nose to be crowded under the loose material at the mine face, and advances the loose material onto the conveyor of the machine by the use of counter-rotating discs having textured surfaces flush with the top of the apron and spaced behind the plow-like nose of the apron. The material is, therefore, progressed by the discs along the apron by the textured top surfaces of the discs and the edges of the discs are recessed beneath the top surface of the apron to shield the edges of the discs from impelling the material off the front of the apron.

A principal object of the present invention, therefore, is to improve upon the efficiency of loading by utilizing counter-rotating discs to promote a continuous flow of material for loading and by shielding the edges of the discs against any impelling action, tending to draw the material away from the conveyor of the machine.

Another object of the invention is to provide an improved form of gathering head for effecting a steady flow of loose material over an apron, in which the flow is attained by crowding the front edge of the apron into the material being loaded, and progressing of the material to the conveyor by the use of counter-rotating discs, recessed in the top surface of the apron and rotating toward each other along the front of the apron.

A still further object of the invention is to provide an improved form of gathering head for effecting a flow of loose material over a relatively wide area onto a conveyor, which is particularly adapted for ripper types of miners and utilizes a wide apron area, wide enough to contain substantially all of the material dislodged from the mine face, in which counter-rotating discs form continuations of the top surface of the apron and maintain a continuous flow of material onto the conveyor.

These and other objects of the invention will appear from time to time as the following specification proceeds and with reference to the accompanying drawings.

In the drawings:

FIGURE 3 is a fragmentary sectional view of the loading head taken substantially along line 3—3 of FIGURE 1; and FIGURE 4 is a fragmentary bottom plan view of the loading head looking at the head along line 4—4 of FIGURE 2.

Figure 1:
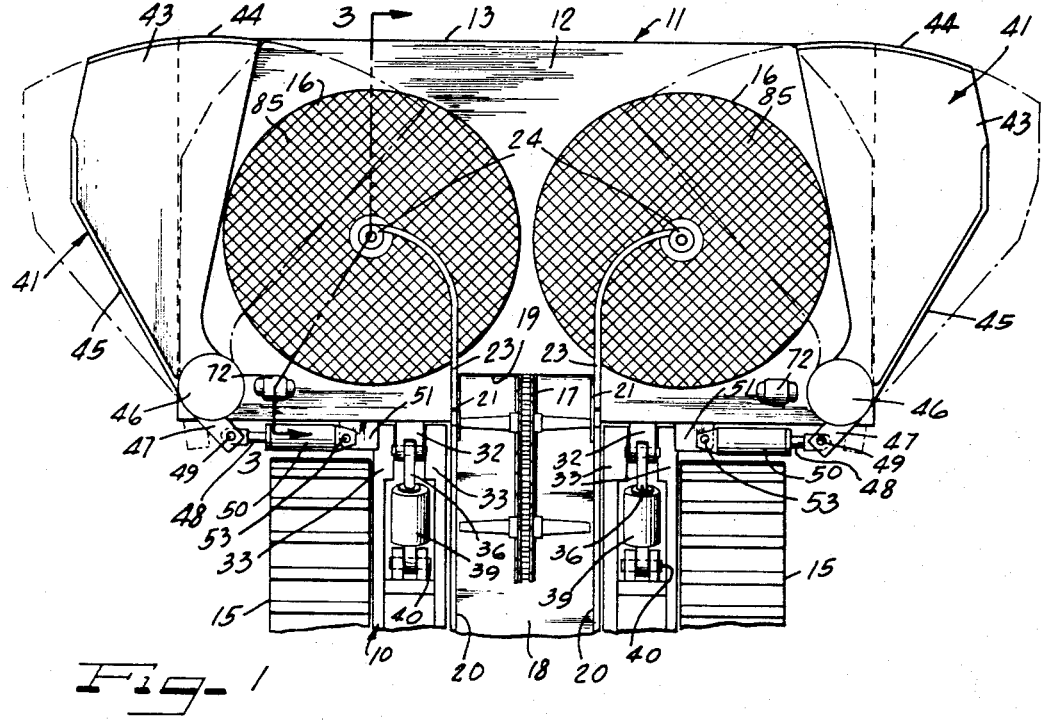
FIGURE 1 is a top plan view of a loading head constructed in accordance with the principles of the present invention and shown as extending across the front of the main frame of a continuous mining machine.
Figure 2:
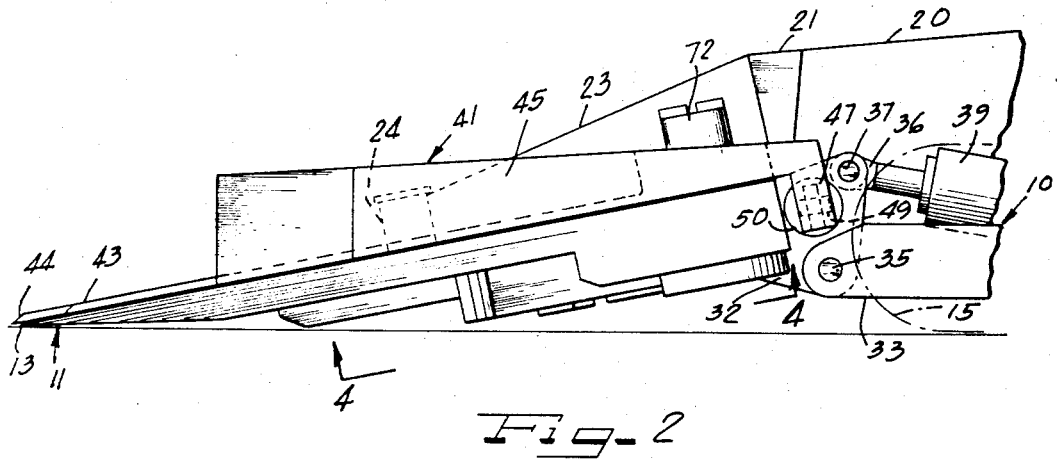
FIGURE 2 is a view in side elevation of the loading head shown in FIGURE 1.

Description of the preferred embodiment of the invention

In the embodiment of the invention illustrated, the forward end portion of a main frame 10, which may be the main frame of a continuous mining machine of the ripper type, is shown as having a loading head 11 transversely pivoted to the forward end thereof and extending therefrom in a downwardly inclined direction. The loading head 11 is in the form of a relatively wide inclined apron 12, shown as extending beyond opposite sides of the main frame 10 and having a plow-like advance edge 13, advanced into the material being loaded, as the mining operation progressed by laterally spaced continuous traction tread devices 15, in a conventional manner.

The apron 12 is shown in FIGURES 1 and 3 as having two relatively large diameter closely spaced gathering discs 16, 16 recessed therein for rotation with respect thereto about axes perpendicular to the plane surface of said apron. The gathering discs 16, 16 are spaced rearwardly of the plow-like edge 13 and are rotatably driven to rotate toward each other along the front portion of the apron and upwardly along the apron to the receiving end of a conveyor 17, extending along the main frame 10, and conveying the mined material beyond the rear end thereof, for loading onto a suitable material carrying apparatus, in a conventional manner. The conveyor 17 is shown as being a single strand chain and flight type of conveyor in which the chain and flights move along a bottom plate 18 of the conveyor. As shown in FIGURE 1, the conveyor 17 extends into a rearwardly opening rectangular recessed portion 19 of the apron 12, to position the receiving end of the conveyor closely adjacent the counter-rotating gathering discs 16.

The conveyor 17 has parallel spaced side walls 20, 20 extending along opposite sides of the pan 18 to positions adjacent the rearward end portion of the apron 12. The side walls 20 have wings 21 secured to the inner sides thereof and extending in advance thereof and extending along the inner sides of strippers 23 slidably engaging said wings. The strippers 23 form forward continuations of the side walls 20 and extend from the centers of the gathering discs 16, 16 in modified cycloidal paths to the side walls 20. The strippers 23 extend inwardly of bosses 24, 24, mounted coaxial of the axes of rotation of the loading discs 16, on bearings 25, carried by flanged pins 26. The flanged pins 26 are shown as being threaded in the disc 16 and have intermediate radial flanges 27 abutting the top surfaces of said discs. Washers 29 and nuts 30 are provided to retain said strippers to the threaded pins 26, to strip material from the top surfaces of the rotating discs 16 toward the conveyor 17 and attain a uniform flow of material onto said conveyor.

The apron 12 has parallel spaced gusset-like brackets 32, extending rearwardly therefrom, between forwardly projecting support bars 33 of the main frame 10. The support bars 33 form a pivotal mounting for the brackets 32, and apron 12 at the lower corners thereof on transverse pivot pins 35. The upper rear corners of the brackets 32 are shown in FIGURE 1 as being bifurcated, to receive the connecting end portion of a piston rod 36, between the furcations thereof. A separate pivot pin 37 pivotally connects each piston rod to the upper rear corner of the associated bracket. Each piston rod 36 is extensible from a cylinder 39, pivoted at its head end to the main frame 10, on a transverse pivot pin 40. The cylinders 39 thus form a means for elevating the apron 12 above the ground about the axes of the pivot pins 35, when it is desired to tram the machine from working place to working place, it being understood that the plow-like end 13 of the apron usually has floating engagement with the ground during loading.

A retainer wing 41 is pivoted to each outer rear corner of the apron 12. As shown in FIGURE 1, each wing 41 includes a flat bottom plate 43 having an advance plow-like edge 44 and having an outer retainer wall 45 extending from a boss portion 46 of the deflector along the flat bottom 43 thereof, and stopping short of the plow-like advance edge 44. The boss 46 forms a pivotal mounting for the wing 41, mounting the wing on the apron 12 for adjustable pivotal movement about an axis extending perpendicular to the plane surface of said apron. A lever arm 47 extends rearwardly and angularly inwardly of the boss 46 and has a piston rod 48 pivotally connected thereto, on a pivot pin 49. The piston rod 48 is extensible from a piston 50, pivotally connected to a ledge 51, extending rearwardly of the apron 12, on a pivot pin 53.

The piston rods 48 extensible from cylinders 50 may position the wings 41 in the outwardly extended maximum clean-up positions indicated by dot-dash lines in FIGURE 1 and may move the wings 41 along the top surface of the apron 12 with the flat plates 43 thereof extending over the top surfaces of the gathering discs 16, for more restricted pickup or loading conditions.

Referring now in particular to FIGURE 3 showing the mounting of the discs 16 on the apron 12 with their top surfaces flush with the top surface of the apron, each disc 16 is rotatably supported within a cylindrical recessed portion 53 of the apron 12 on annular roller thrust bearings 55, including a stationary race 56 mounted in and engaging a shouldered portion 57 of the recess 53, and movable races 59, 59 retained to the bottom surface of the disc as by machine screws 60. The rollers of the bearing are herein shown as being cylindrical in form with the cylindrical surfaces of the rollers engaging the angularly upwardly facing surface of the stationary race 56 and angularly downwardly facing surface of the races 59. Said bearing may also be in the form of a tapered roller thrust bearing or an axial thrust ball bearing.

Each disc 16 has a central boss portion 63 within which the flanged pin 26 is threaded, which has a reduced diameter lower end portion 64 extending within a central bore 65 of spur gear 66. The spur gear 66 abuts the bottom of an annular boss 67 spaced outwardly of the boss 63 and is retained thereto as by cap screws 69. The spur gear 66 is meshed with spur gear 70, driven from a reduction spur gear train 71, which in turn is driven from a motor 72 mounted on the top surface of the apron 12, inwardly of the boss 46, and rearwardly of the associated disc 16. The motor 72 has a motor shaft 73 splined or otherwise having driving engagement with an aligned drive shaft 74. The shaft 74 has a spur pinion 75 thereon, intermediate the ends thereof. The spur pinion 75 meshes with and drives a spur gear 76 of the spur gear train 71. The shaft 74 is journalled above the pinion 75, in the apron 12, on an anti-friction bearing 77. An anti-friction bearing 79 forms a bearing support for the lower end of the shaft 74 on a bottom housing plate 80 for the gear reduction train 71. The shafts for the gears of the gear reduction train 71 are journalled in the undersurface of the apron and in the bottom housing plate 80, in a manner similar to which the shaft 74 is journalled.

The motor 72 is shown as being a fluid pressure operated motor and drives the spur gear reduction train 71 and an associated loading relatively large diameter disc 16 at a relatively slow angular speed, which may be in the order of 40 r.p.m. A speed range of between 40 and 75 r.p.m. has been found to be sufficient to keep the loose material on the discs in motion and to flow the loose material toward the center of the apron 12 and upwardly therealong between the strippers 23 onto the conveyor 17 at a uniform rate.

As shown in FIGURE 4, the drive gears 66 for the loading discs 16 are tied together to effect rotation of said loading discs at the same rates of speed and in opposite directions, by tying-gears 83 meshing with the gears 66 and meshing with each other at the center of the machine.

The top surface of each loading disc 16 is shown in FIGURES 1 and 3 as being textured, to provide a friction gripping surface having sufficient friction gripping ability to keep the loose material deposited on the apron in motion and to flow the loose material between the strippers 23 onto the conveyor 17. This friction gripping ability of the loading discs 16 may be attained by machining grooves 85 in the top surface of the discs or by mounting a grating in the form of a conventional form of 4-way non-skid metal floor plate (not shown) on each disc, with the top of the plate flush with the top surface of the apron. Chicken wire or a heavy hardware cloth, or any other form of material giving a friction texture to the top surface of the disc, and having the wearability required to stand up under very strenuous conditions encountered in mining may also be used.

A 4-way non-skid floor plate has been found to be a very satisfactory material to give the top surface of the disc a long wearing friction textured surface, although the machining of grooves in the top surface of the disc also affords a satisfactory long wearing textured surface of the disc.

In the operation of loading, assuming the loading head is disposed beneath the ripper cutter drum of a continuous mining machine, the material mined by the ripper cutter drum drops directly onto and in front of the apron 12, throughout the width thereof, and is retained thereto, as by wings 41, 41. As the mining operation progresses, the continuous traction tread devices 15, 15 crowd the loading head into the dislodged material on the mine floor in front of the apron, scooping up the material by the plow-like loading edge 13 onto the apron and the counter-rotating loading discs 16. The textured surfaces of the counter-rotating loading discs will keep the loose material in motion and effect the flow of the material on the head to the center area of the head, directly onto the conveyor, between the strippers 23. The material on the outer edges of the apron and back of the loading head will be initially progressed in a forward direction by the loading discs 16. The textured surfaces of the rotating loading discs, however, will permit slippage of the material on the loading discs with respect to the discs especially where the discs are heavily loaded so that a large percentage of material on the discs will remain thereon and will uniformly flow to the central area between the discs and stripped from said discs by the strippers 23 and thereby loaded onto the conveyor 17 at a continuous rate.

While we have herein shown and described one form in which our invention may be embodied, it may readily be understood that various variations and modifications in the invention may be attained without departing from the spirit and scope of the novel concepts thereof.

We claim as our invention:

1. In a loading device for loading loose material, a main frame, continuous traction tread devices supporting and propelling said main frame along the ground, a conveyor extending along said main frame, an inclined apron extending across the front of said main frame into slidable engagement with the ground and having a plow-like leading edge, the improvement comprising:
   a pair of generally flat counter rotating gathering disks rotatably movable along said apron towards each other at the forward end of said apron, and disposed rearwardly of said plow-like leading edge for flowing the loose material deposited thereon onto said conveyor,
   stripper plates extending over said apron from the axes of rotation of said gathering disks toward and along opposite sides of said conveyor for stripping the loose material from said gathering disks and confining the loose material to flow onto said conveyor,
   upright wings pivotally mounted on said apron adjacent opposite sides thereof and at the rear end thereof for movement along said apron toward and from said gathering disks,
   said wings having bottom surfaces slidably movable over said apron and over said gathering disks and having upright retainer walls extending along the outer sides of said apron,
   and power means for moving said wings along said apron and over said gathering disks toward and from said stripper plates.

2. The structure of claim 1,
wherein the gathering disks are recessed in said apron and have top material engaging surfaces forming a flat continuation of said apron and having textured top surfaces promoting a continuous movement of the material on said disks toward said conveyor.

3. In a loading device for loading loose material, a main frame, continuous traction tread devices supporting and propelling said main frame along the ground, a conveyor extending along said main frame, an inclined apron extending across the front of said main frame and conveyor into slidable engagement with the ground and having a plow-like leading edge, the improvement comprising:
   a pair of generally flat counter rotating gathering disks at the front of said apron, rotatably movable along said apron toward each other about axes perpendicular to said apron and spaced equal distances from opposite sides of said conveyor,
   means for driving said counter rotating disks to rotate toward the center of said conveyor,
   said counter rotating disks having top surfaces closely adjacent the top surface of said apron and being disposed rearwardly of said plow-like leading edge for flowing the loose material deposited thereon towards said conveyor,
   stripper means extending over said disks from the axes of rotation thereof to the side walls of said conveyor for stripping the loose material therefrom for flow onto said conveyor, and
   means confining and advancing the material along said gathering disks toward the center of the conveyor comprising,
   upright wings extending along opposite sides of said apron,
   means pivotally mounting said wings on said apron adjacent the rear end thereof at opposite sides thereof for movement about axes perpendicular to the plane of said apron,
   said wings each having a bottom plate extending over said apron and generally conforming to said apron and gathering disks and having a plow-like advance edge and an outer retainer wall extending along said bottom plate for at least a portion of the length thereof,
   and power means connected with said wings and selectively operable to extend said wings outwardly with respect to said apron with said bottom plates lapping said apron, to increase the effective loading width of said apron and to move said wings over said apron and gatherink disks toward the center of said apron to confine and advance the loose material along said gathering disks to be picked up thereby and advanced onto said conveyor.

References Cited

UNITED STATES PATENTS

| | | | |
|---|---|---|---|
| 944,438 | 12/1909 | Holmested | 198—9 |
| 1,855,998 | 4/1932 | Shannon | 198—9 |
| 1,862,230 | 6/1932 | McDermott | 198—9 |
| 2,713,479 | 7/1955 | Wiebe | 198—9 |
| 2,753,971 | 7/1956 | Ball | 198—9 |

RICHARD E. AEGERTER, *Primary Examiner.*